US007696756B2

(12) United States Patent
Morys et al.

(10) Patent No.: US 7,696,756 B2
(45) Date of Patent: *Apr. 13, 2010

(54) OIL BASED MUD IMAGING TOOL WITH COMMON MODE VOLTAGE COMPENSATION

(75) Inventors: Marian L. Morys, Downington, PA (US); William J. Schaecher, Houston, TX (US); George D. Goodman, Phoenixville, PA (US); Raj Pai, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 548 days.

This patent is subject to a terminal disclaimer.

(21) Appl. No.: 11/422,135

(22) Filed: Jun. 5, 2006

(65) Prior Publication Data

US 2007/0103162 A1 May 10, 2007

Related U.S. Application Data

(60) Provisional application No. 60/734,917, filed on Nov. 9, 2005, provisional application No. 60/733,761, filed on Nov. 4, 2005, provisional application No. 60/734,846, filed on Nov. 9, 2005, provisional application No. 60/735,107, filed on Nov. 9, 2005, provisional application No. 60/736,105, filed on Nov. 10, 2005.

(51) Int. Cl.
*G01V 3/18* (2006.01)
(52) U.S. Cl. ........................ 324/366; 324/370; 324/374; 324/375
(58) Field of Classification Search ................ 324/366, 324/367, 347, 371, 374, 355, 373, 370, 375; 702/7, 11
See application file for complete search history.

(56) References Cited

U.S. PATENT DOCUMENTS

| 3,470,457 | A |   | 9/1969  | Howlett |
|-----------|---|---|---------|---------|
| 4,931,737 | A |   | 6/1990  | Hishiki |
| 5,339,037 | A |   | 8/1994  | Bonner et al. |
| 5,570,024 | A | * | 10/1996 | Vail, III ........................ 324/368 |
| 5,596,534 | A |   | 1/1997  | Manning |
| 5,861,771 | A |   | 1/1999  | Matsuda et al. |

(Continued)

FOREIGN PATENT DOCUMENTS

WO    WO2005/059285    6/2005

OTHER PUBLICATIONS

Millamn, Jacob, "Microelectronics; Digital and Analog Circuits and Systems", McGraw-Hill, Figures 16-8, 16-10(a), 16-11, 17028, (1979), pp. 573-577 and 654.

*Primary Examiner*—Reena Aurora
(74) *Attorney, Agent, or Firm*—Krueger Iselin LLP (57) ABSTRACT

An apparatus and method for minimizing the effects of a common mode voltage signal in downhole logging tools utilized to determine the resistivity of an adjacent portion of a borehole wall. Two current electrodes are energized by an excitation source to create an oscillatory electric field in a borehole wall. A voltage drop across a segment of the borehole wall is measured by two voltage electrodes, and the differential voltage is used in combination with a measured current flow to determine a resistivity value for the borehole wall. A common mode voltage in front of the two voltage electrodes is measured and minimized by controlling the excitation source, thereby reducing the resistivity measurement error.

25 Claims, 7 Drawing Sheets

U.S. PATENT DOCUMENTS

| | | |
|---|---|---|
| 6,023,168 A | 2/2000 | Minerbo |
| 6,191,588 B1 | 2/2001 | Chen |
| 6,348,796 B2 | 2/2002 | Evans et al. |
| 6,564,883 B2 | 5/2003 | Fredericks et al. |
| 6,600,321 B2 | 7/2003 | Evans |
| 6,603,314 B1 | 8/2003 | Kostelnicek et al. |
| 6,636,406 B1 | 10/2003 | Anthony |
| 6,891,377 B2 | 5/2005 | Cheung et al. |
| 7,109,719 B2 | 9/2006 | Fabris et al. |
| 7,119,544 B2 | 10/2006 | Hayman et al. |
| 7,242,194 B2 | 7/2007 | Hayman et al. |
| 2003/0222651 A1* | 12/2003 | Tabanou ................ 324/367 |
| 2005/0067190 A1 | 3/2005 | Tabanou |
| 2005/0179437 A1 | 8/2005 | Hayman et al. |
| 2007/0046291 A1 | 3/2007 | Itskovich |
| 2007/0103161 A1* | 5/2007 | San Martin et al. ......... 324/366 |

* cited by examiner

OIL BASED MUD IMAGING TOOL WITH COMMON MODE VOLTAGE COMPENSATION

CROSS-REFERENCE TO RELATED APPLICATIONS

The present application claims the benefit of, and incorporates by reference, provisional application Ser. No. 60/734,917, filed Nov. 9, 2005, and entitled "OBMI Tool with Common Mode Voltage Compensation." The present application additionally claims the benefit of, and incorporates by reference, the following related applications: (1) provisional application Ser. No. 60/733,761, filed Nov. 4, 2005, and entitled "Oil Based Imaging Tool that Measures Voltage Phase and Amplitude"; (2) provisional application Ser. No. 60/734,846, filed Nov. 9, 2005, and entitled "Standoff Compensation for Imaging in Oil-Based Muds"; (3) provisional application Ser. No. 60/735,107, filed Nov. 9, 2005, and entitled "OBMI Tool with Guarded Electrode Current Measurement"; and (4) provisional application Ser. No. 60/736,105, filed Nov. 10, 2005, and entitled "Displaced Electrode Amplifier."

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

In these and other logging environments, it is desirable to construct an image of the borehole wall. Among other things, such images reveal the fine-scale structure of the penetrated formations. The fine-scale structure includes stratifications such as shale/sand sequences, fractures, and non-homogeneities caused by irregular cementation and variations in pore size. Orientations of fractures and strata can also be identified, enabling more accurate reservoir flow modeling.

Borehole wall imaging can be accomplished in a number of ways, but micro-resistivity tools have proven to be effective for this purpose. Micro-resistivity tools measure borehole surface resistivity on a fine scale. The resistivity measurements can be converted into pixel intensity values to obtain a borehole wall image. However, oil-based muds can inhibit such measurements due to the variability of impedance in the mud surrounding the tool. U.S. Pat. No. 6,191,588 (Chen) discloses an imaging tool for use in oil-based muds. Chen's resistivity tool employs at least two pairs of voltage electrodes positioned on a non-conductive surface between a current source electrode and a current return electrode. At least in theory, the separation of voltage and current electrodes eliminates the oil-based mud's effect on voltage electrode measurements, enabling at least qualitative measurements of formation resistivity.

In constructing an imaging tool for use in oil-based muds, certain engineering constraints on the structural strength of sensor pads will be recognized. The engineering constraints may be met by making the sensor pad base out of a metal such as steel. Though the steel can be insulated to present a non-conductive external surface, the electrical conductivity of the base creates potential current leakage paths via the metal body of the pad. These leakage paths affect the accuracy and stability of the tool's resistivity measurements and can cause error in the measurement of formation resistivity, especially when the source current operating frequency increases.

Another source of formation resistivity measurement error is caused by the finite input impedance of the differential voltage amplifier circuitry coupled to the differential voltage sensing voltage electrodes. This error is further exacerbated by the presence of a common mode voltage between the formation under the voltage electrodes and the reference voltage of the amplifier circuitry. The finite input impedance of the amplifier circuit allows a small amount of current to flow into the voltage electrodes and amplifier, creating a variable voltage divider that causes the common mode voltage to affect the differential voltage at the voltage electrodes. The influence of the common mode voltage on the differential voltage measurement creates inaccuracies in the borehole resistivity images.

One proposed method of reducing the common mode voltage relies on isolating the current source transmitter circuitry from the reference ground of the amplifier. For this method to work, the impedance of the isolation between the transmitter and the reference ground would have to be significantly higher than the impedance between the voltage electrodes and the formation. Unfortunately, such an environment would be very difficult, if not impossible, to achieve because the impedance from the voltage electrodes to the formation is often much higher than the parasitic impedance from the transmitter to the amplifier reference ground due to the presence of the layer of oil-based mud in the borehole. Accordingly, an improved method and system to minimize the effects of a common mode voltage signal in borehole resistivity imaging is needed.

BRIEF DESCRIPTION OF THE DRAWINGS

In the following detailed description, reference will be made to the accompanying drawings, in which.

The drawings show illustrative invention embodiments that will be described in detail. However, the description and accompanying drawings are not intended to limit the invention to the illustrative embodiments, but to the contrary, the intention is to disclose and protect all modifications, equivalents, and alternatives falling within the spirit and scope of the appended claims.

DETAILED DESCRIPTION

Disclosed herein are various methods and systems for minimizing the effects of a common mode voltage signal in instruments and systems for imaging in nonconductive fluids such as an oil-based mud. In some embodiments, disclosed logging systems include a logging tool in communication with surface computing facilities such as a personal computer, server, or digital signal processing board, or some other form of computing circuit. The logging tool is provided with a sensor array having at least two voltage electrodes positioned between at least two current electrodes that inject an excitation signal into a borehole wall formation, and is further provided with an electronic amplifier circuit to determine a differential voltage between the voltage electrodes and two current flows from separate ones of the current electrodes. A common mode voltage, arising from the potential difference between the formation and the reference ground of the differential voltage amplifier circuit, is measured. The injected current excitation signal is altered and is monitored in real time in order to minimize the common mode voltage without reducing the electric field creating the differential voltage in the borehole wall.

Figures 1, 2:
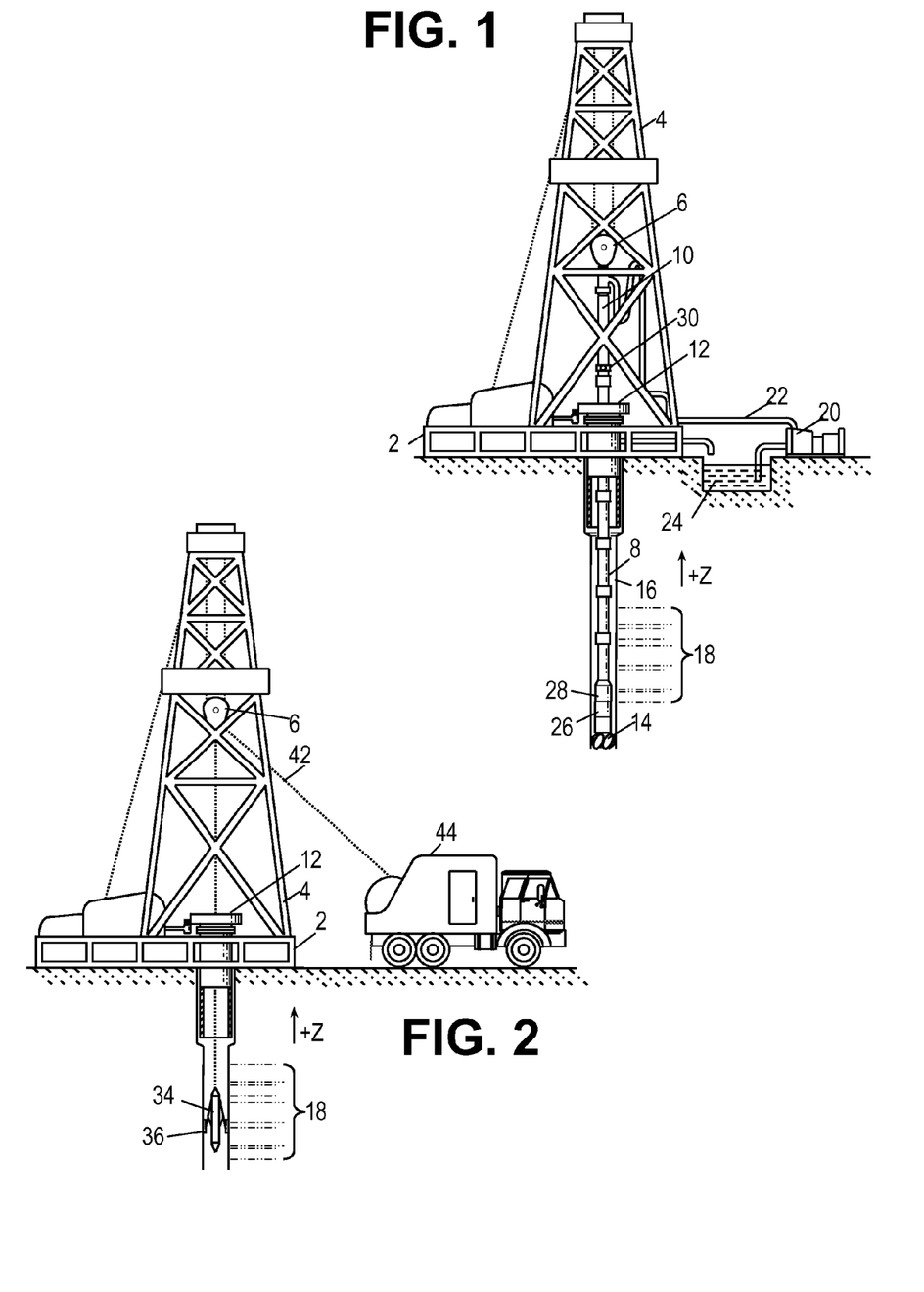
FIG. 1 shows an illustrative logging while drilling (LWD) environment.
FIG. 2 shows an illustrative wireline logging environment.

FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An LWD resistivity imaging tool 26 is integrated into the bottom-hole assembly near the bit 14. As the bit extends the borehole through the formations, logging tool 26 collects measurements relating to various formation properties as well as the bit position and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver.

At various times during the drilling process, the drill string 8 may be removed from the borehole. Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool.

Figure 3:
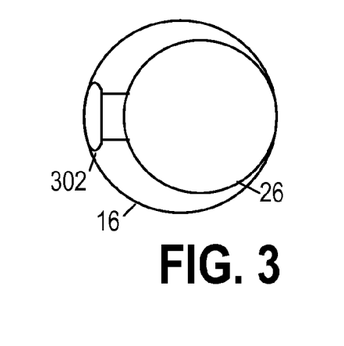
FIG. 3 shows an illustrative first logging tool configuration.

FIG. 3 shows a cross-sectional view of LWD resistivity imaging tool 26 in a borehole 16. A biasing mechanism 302 de-centralizes tool 26 to minimize the standoff between the tool's sensors and the borehole wall. The tool's sensors may be located in a pad on biasing mechanism 302, or alternatively the sensors may be located in the main body of the tool opposite the biasing mechanism. As the tool 26 rotates and progresses downhole at the drilling rate, the sensors will trace a helical path on the borehole wall. Orientation sensors within the tool may be used to associate the resistivity measurements with the sensors' positions on the borehole wall. Surface computing facilities may collect resistivity measurements, orientation (azimuth) measurements, and tool position measurements, and may process the collected measurements to create a resistivity image of the borehole wall.

Figure 4:
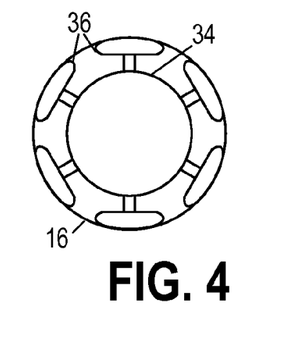
FIG. 4 shows an illustrative second logging tool configuration.

FIG. 4 shows a cross-sectional view of one embodiment of the wireline resistivity imaging tool 34 in a borehole 16, depicting a possible configuration of a LWD imaging tool. Sensing pads 36 are deployed against the borehole wall to minimize standoff. Multiple pads may be used to obtain measurements over a greater fraction of the borehole's circumference. In some embodiments, the pads are provided in axially-offset groups to increase circumferential coverage without undue crowding in the undeployed configuration.

In the logging scenarios described above with respect to FIGS. 1 and 2, the drilling fluid present in the borehole is an electrically nonconductive fluid such as an oil-based mud. Some of the fluid may mix with drill cuttings or material from the borehole walls to form a viscous semi-solid layer on the borehole walls. This layer is commonly termed "mudcake," and it prevents intimate contact between logging sensors and uncontaminated formation material. In addition, motion of the logging instruments may create a fluid flow layer that further separates the logging sensors from the uncontaminated formation materials.

The mudcake and fluid flow layers have a very low conductivity, which creates some difficulty for high-resolution measurements of borehole wall resistivity. Measurements through the low-conductivity layers may be improved by (1) using an alternating current, (2) separating the electrodes that source a current from the electrodes that measure a voltage, and (3) using a source current with a higher operating frequency.

Figure 5:
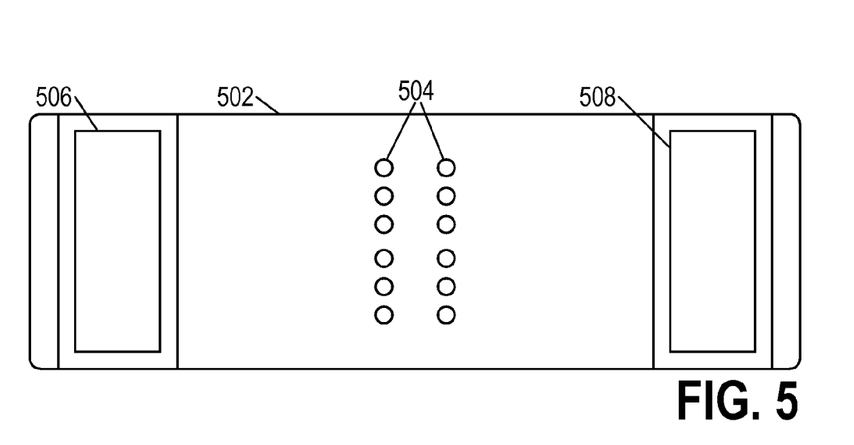
FIG. 5 shows a front view of an illustrative sensor pad.

FIG. 5 shows the face of an illustrative sensor pad 502 having six pairs of voltage electrodes 504 positioned between current electrodes 506 and 508. In practice, the sensor pads may be provided with additional voltage and current electrodes, and in fact may operate on multiple axes. With uniaxial sensor pads such as pad 502, the length of the sensor pad is kept parallel to the long axis of tool 34. The distance between the current electrodes 506, 508 controls the depth of investigation, with greater distances providing greater depths of investigation. The distances between the voltage electrodes 504 control the spatial resolution of the tool, with smaller distances providing higher resolutions.

Figure 6:
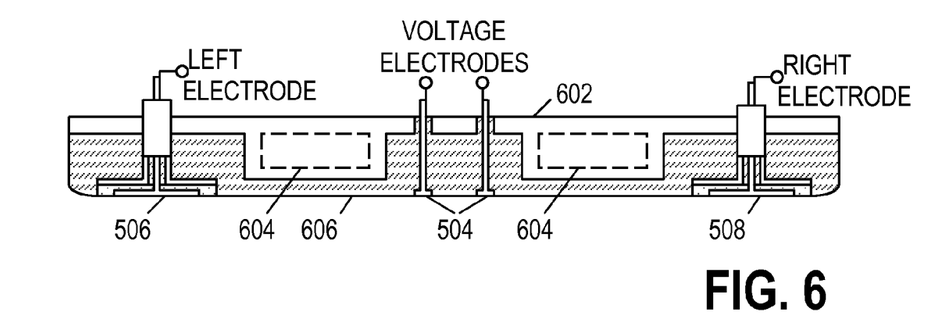
FIG. 6 shows a cross section of the illustrative sensor pad.

A cross-section of the illustrative sensor pad 502 is shown in FIG. 6. Sensor pad 502 comprises a metal substrate 602 to provide the pad with the needed rigidity and strength. The metal substrate 602 may include cavities 604 to hold sensor circuitry. For illustrative purposes, the electrode feeds are shown passing through the sensor pad 502, but the electrode feeds may alternatively connect to the sensor circuitry in cavities 604 or in a central cavity (not shown). In some embodiments, metal substrate 602 comprises steel. The face of metal substrate 602 is covered with an insulating layer 606, which in some embodiments comprises a polyetheretherketone (PEEK) material. Current electrodes 506 and 508 are embedded on the face of the insulating layer 606.

Figure 7A:
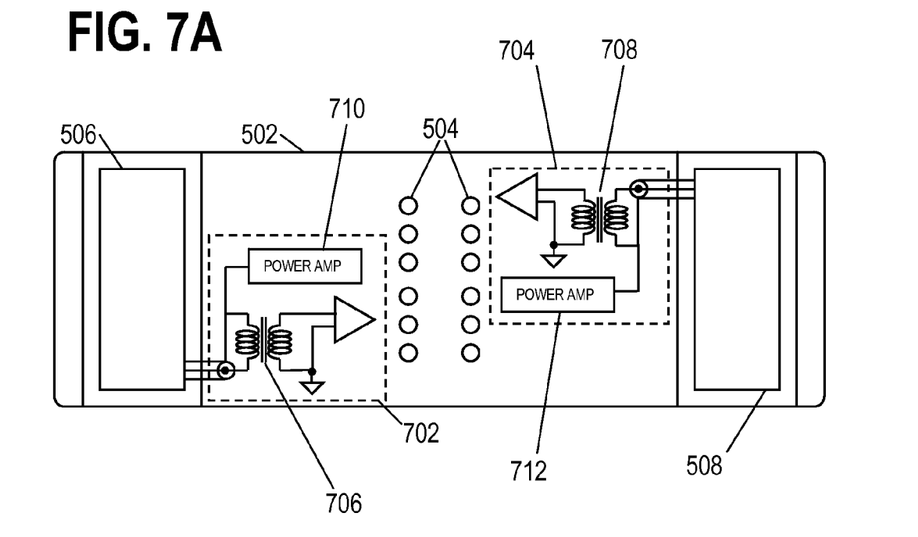
FIG. 7A shows an illustrative current sensor configuration.

In certain embodiments of the present invention, the current flowing into current electrodes 506, 508 may be measured and then used to determine the resistivity of the adjacent formation. Referring to FIG. 7A, current sensors 702, 704 are shown. In illustrative embodiments of the present invention, current sensors 702, 704 include transformers 706, 708 that are used to assist in measuring the current associated with current electrodes 506, 508. Further, the source current is routed through power amplifiers 710, 712 in the present embodiment. In the illustrative embodiment, transformer 706 is coupled between power amplifier 710 and left current electrode 506 so that the current measurement includes only the current flowing into current electrode 506. Similarly, transformer 708 is coupled between power amplifier 712 and right current electrode 508 so that the current measurement includes only the current flowing into current electrode 508. Since the total current from the source is known, and the current flowing into current electrodes 506, 508 is measured, an accurate measurement of the excitation current injected into the formation is known and does not lead to a distorted calculation of formation resistivity.

When tool 34 is operated at a very low source current frequency of excitation (i.e., approximately less than 2-5 kHz), the capacitive coupling to the metal body of sensor pad 502 is negligible, meaning that the current leakage between current electrodes 506, 508 and the metal body of sensor pad 502 is very small and the measurement of excitation current injected from current electrodes 506, 508 is relatively accurate. However, the operation of tool 34 at low current frequencies results in poor accuracy when measuring borehole wall resistivity due to the low voltage difference generated between voltage electrodes 504. The use of higher frequencies (e.g., in excess of 5 kHz, and typically in the range of 10 kHz to 100 kHz) can provide more accurate measurements of the adjacent borehole wall resistivity, and is preferable for the measurement of low resistivity formations (i.e., less than 5 Ohm-m). An increase in the source current excitation frequency may produce a corresponding undesirable increase in current leakage from current electrodes 506, 508 to the metal body of pad sensor 502. The measurement error induced by this leakage current can be reduced by the use of guard electrodes and the method explained in the related application referenced herein, entitled "OMBI Tool with Guarded Electrode Current Measurement."

Figure 7B:
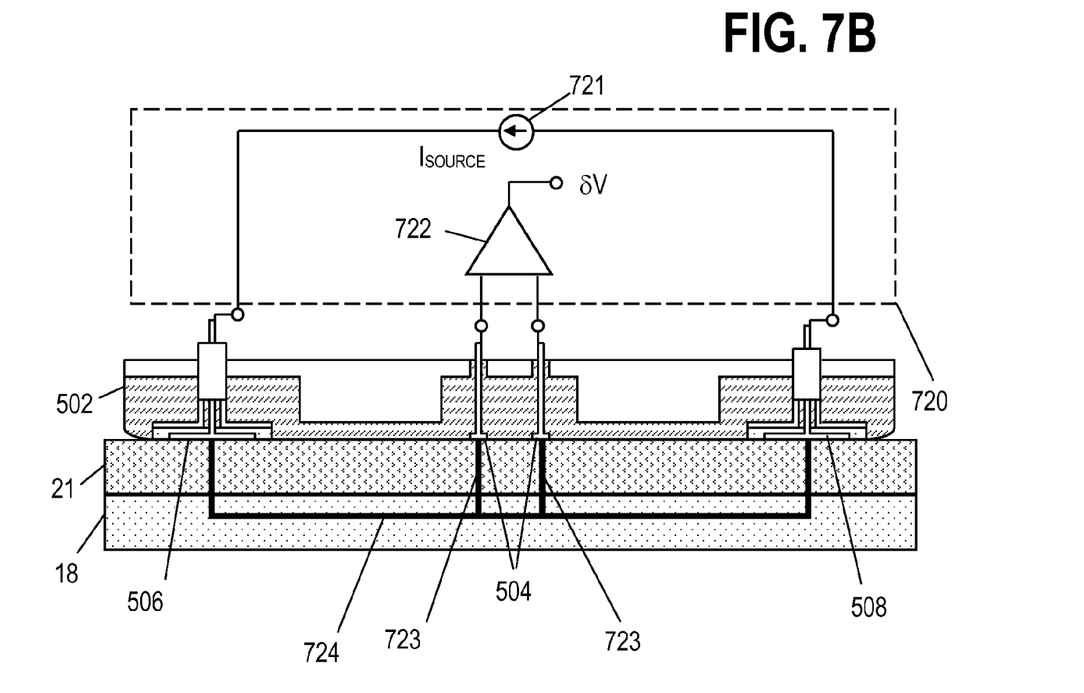
FIG. 7B shows an illustrative sensor pad circuit configuration.

Referring now to FIG. 7B, a first illustrative configuration of an oil-based mud imager (OBMI) tool is shown. Circuit 720 represents a simplified illustration of excitation current source 721 and differential voltage amplifier 722. During the use of an OBMI tool having this configuration, a significant source of error in the measurement of formation resistivity values arises from inaccuracies in the voltage measurements of tool 34 caused by the finite input impedance of the differential voltage amplifier 722 coupled to voltage electrodes 504. The large but non-infinite input impedance of the differential voltage amplifier 722 allows a small amount of current 723 to flow into the amplifier electronics via voltage electrodes 504. This current flow causes a voltage drop in the mud layer 21 in front of voltage electrodes 504. Since the mud layer 21 in front of each voltage electrode 504 is not uniform, the occurrence of each voltage drop is different.

As a result, an erroneous and unwanted voltage differential is created between voltage electrodes 504 and is superimposed to the voltage difference that is proportional to the resistivity of formation 18 generated by current flow 724 that flows parallel to the surface of pad 502. This erroneous and unwanted voltage differential attributable to the finite input impedance of amplifier 722 is, to a first order approximation, proportional to the common mode voltage. Common mode voltage is the potential difference between the reference ground of amplifier 722 and the mean potential of the formation in front of voltage electrodes 504. While the reference ground of amplifier 722 is often connected to the metal body of sensor pad 502, other implementations are possible where the reference ground is offset or driven to a different potential.

The effect of this measurement error may be significant during the measurement of formations with a low resistivity (i.e., less than 5 Ohm-m) using the current injection method described above, wherein the measurement of a low voltage difference between voltage electrodes 504 may be needed. In order to reduce the measurement error due to the effect of common mode voltage on the differential voltage, the common mode voltage at voltage electrodes 504 is minimized in the preferred embodiments.

Figure 8A:
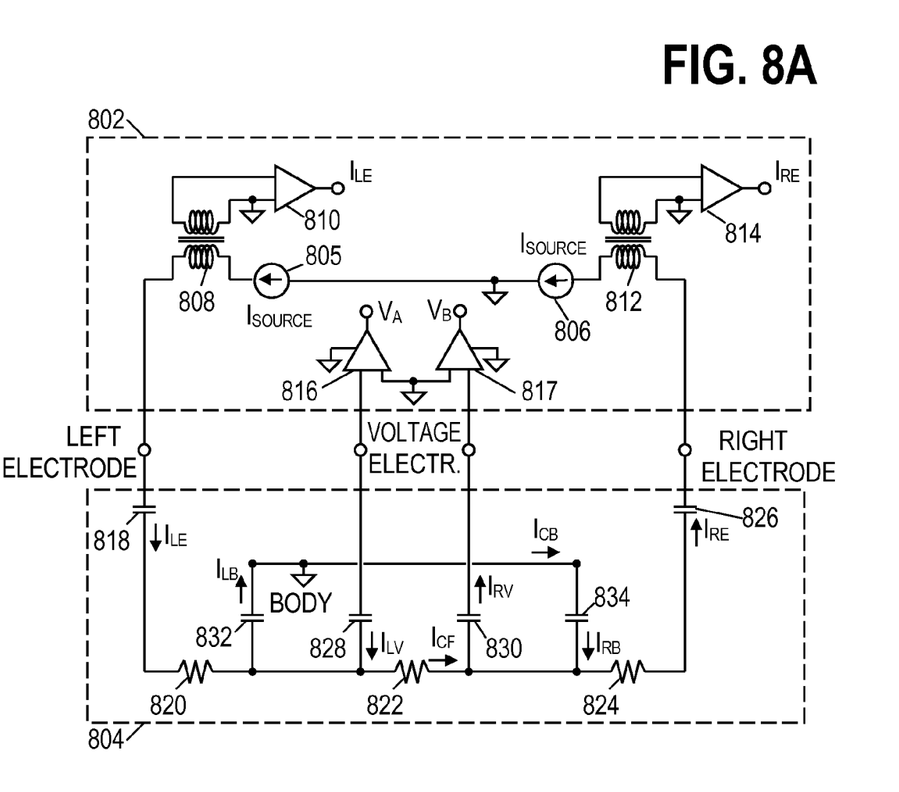
FIG. 8A shows an illustrative dual-transmitter circuit model for the illustrative sensor pad.

FIG. 8A shows an illustrative circuit model for pad 502 as it operates to minimize common mode voltage while measuring formation resistivity. Pad 502 comprises measurement circuitry 802 coupled to the voltage electrodes and current electrodes. The various electrodes in turn couple to the measurement environment that is modeled as an equivalent circuit 804. The equivalent circuit 804 is a simplified approximation of the borehole wall's electrical characteristics, and is provided here as an aid to understanding the configuration of the measurement circuitry 802.

In a preferred embodiment of the present invention, measurement circuitry 802 comprises current or voltage source transmitters 805, 806 that drive an oscillating excitation current between the current electrodes ("right electrode" and "left electrode"). The two independently controlled transmitters 805, 806, or excitation sources, may be connected directly or through an impedance to a ground common to all circuitry in pad 502. Transmitters 805, 806 each have separate controls for the relative magnitude and the relative phase of the excitation signal. The ability to control one or both of transmitters 805, 806 provides the capability to inject a synchronized excitation current from the right electrode and left electrode at the desired frequency with relative phase and/or amplitude independently controlled as required for achieving the needed amplitude and phase to minimize the common mode voltage. In certain embodiments, the control of transmitters 805, 806 may be accomplished by the use of either firmware or hardware based Numerically Controlled Oscillators (NCO's). Alternatively, the control of transmitters 805, 806 may be accomplished by use of Phase-Locked-Loops (PLL's).

Initially, detectors 816, 817 are utilized to measure the common mode voltage at voltage electrodes 504 by sampling the voltage signals $V_A$ and $V_B$ using an analog-to-digital converter. The digital signals are then averaged to find the common mode voltage $V_C$ (i.e., $V_C=(V_A+V_B)/2$). In addition, the relative phase may be determined by performing quadrature detection in firmware. Alternatively, it is contemplated that the power rails for detectors 816, 817 may be at regulated offsets from the reference terminal voltage. In such alternative embodiments, the common mode voltage may be added to the regulated offset of each power rail to make the common mode voltage appear to equal zero.

Once the common mode voltage at voltage electrodes 504 is known, the differential voltage created by the current electrodes 506, 508 may be altered to reduce the common mode voltage and thereby minimize its effect on the measurement of the adjacent formation resistivity. A controller module may set the amplitude and phase of transmitters 805, 806 in response to measurements of the signals from each voltage electrode. With the phase and magnitude of the common mode voltage signal known, and the phase and magnitude of transmitters 805, 806 controllable, the controller adjusts the voltage of the current electrodes such that the desired excitation current is obtained and the common mode signal is minimized.

Transmitters 805, 806 are coupled to the right electrode and left electrode through transformers 808, 812. Right electrode 506 and left electrode 508 inject an excitation current into the formation, creating a voltage difference in the formation that is measured by voltage electrodes 504. During the injection of an excitation current, a voltage between the common ground of transmitters 805, 806 and the formation in front of voltage electrodes 504 is created that constitutes a common mode voltage ($V_C$). The common mode voltage $V_C$ is comprised of the voltage contributed from transmitters 805, 806 ($V_1$ and $V_2$, respectively), in proportion to the complex gains from each transmitter ($K_{V1}$ and $K_{V2}$, respectively). Since the desire is to make $V_C$ equal to zero, then:

$$V_1 \cdot K_{V1} = -V_2 \cdot K_{V2}, \tag{1}$$

and, where solving the equal for $V_2$ in order to compensate for $V_1$ results in:

$$V_2 = -V_1 \cdot K_{V1}/K_{V2}, \tag{2}$$

and, where the amplitude $A=|V_1+V_2|$ is the total voltage drop to create the desired formation excitation current, then voltage $V_1$ can be calculated as:

$$V_1 = A/|1 - K_{V1}/K_{V2}|. \tag{3}$$

If the system is linear, equations (2) and (3) provide an accurate solution to generating the desired excitation current magnitude while balancing the common mode voltage to zero. In some instances, a residual common mode voltage may remain after the steps of altering the operating current injected into the formation, in which case an adoptive trimming process may be performed. Further, in certain embodiments the common mode voltage minimization method may be executed concurrently with the common mode measurement process, resulting in a system that dynamically maintains the common mode voltage at or near zero, regardless of changes in surrounding conditions.

Once the common mode voltage is known, the independent control of transmitters 805, 806 is established, and the current electrode voltages are altered to minimize common mode voltage, the imaging of the adjacent borehole wall resistivity may proceed with minimal impact from common mode voltage. Current sensors, comprising transformers 808, 812 and amplifiers 810, 814, are coupled to the right electrode and left electrode to measure simultaneous current flows from the two current electrodes. The measured currents may be corrected to compensate for baseline current flow (i.e., the current flow that would be measured if the tool were isolated in a vacuum or in air). In some embodiments, the voltage of each current electrode (relative to the tool body) is measured and multiplied by a vacuum calibration constant to determine the baseline current from that current electrode. Note that the current electrodes may be at different voltages, causing a different baseline current to be determined for each current electrode. The corrected current values are determined by subtracting each baseline current from the measured current for the respective current electrode.

In addition to current sense amplifiers 810, 814 for the current measurements, measurement circuitry 802 includes detectors 816, 817 for each voltage electrode pair to measure the potential difference generated by the formation excitation currents. The potential difference ($\delta V$) may be quantified as the difference between voltage signals $V_A$ and $V_B$ (i.e., $\delta V = V_A - V_B$). Detectors 816, 817 may take the form of separate sense amplifiers for each voltage electrode, and in alternative embodiments, may take the form of a differential voltage amplifier. In both cases, circuitry 802 may include analog-to-digital converters to enable digital processing of the measured potential differences. These potential differences are associated with a position on the borehole wall and processed to estimate formation resistivity at that position.

Equivalent circuit 804 includes components 818-826 that approximate a theoretical current path between the current electrodes. Capacitor 818 represents a capacitive coupling between the left electrode and the borehole wall. Resistors 820, 822, and 824 represent resistive portions of the borehole wall, and capacitor 826 represents a capacitive coupling between the borehole wall and the right electrode. Capacitors 828 and 830 represent capacitive couplings between the voltage electrodes and the measured portion of the borehole wall. Indirect coupling is present as represented by capacitors 832 and 834. The current labeled $I_{CF}$ flows through resistor 822, and it is the current of interest for determining formation resistivity. Given the measured electrode currents the voltage electrode currents, it is possible to estimate the current of interest, $I_{CF}$, and hence the resistivity of the adjacent borehole wall formation.

A processor may be provided as part of measurement circuitry 802 to calculate resistivity values. Alternatively, current and voltage measurements may be communicated to surface computing facilities to calculate the resistivity values. The resistivity estimation can be expressed as a function:

$$R = f(\delta V, I_{LE}, I_{RE}) \tag{4}$$

where $I_{LE}$ is the current present at the left current electrode, and $I_{RE}$ is the current present at the right current electrode. The function can take a number of forms depending on experimentally measured sensor pad characteristics. In some embodiments, the resistivity estimation is the measured voltage difference divided by a weighted sum of the measured corrected electrode currents, which have been corrected through the compensation of shield leakage currents:

$$R = k \, \delta V / (c_0 I_{MAX} + c_1 I_{MIN}), \tag{5}$$

where k is a calibration constant based on the sensor pad geometry, $I_{MAX}$ is the greater of the corrected electrode currents, $I_{MIN}$ is the lesser of the corrected electrode currents, and $c_0$ and $c_1$ are weight factors that sum to unity. In one embodiment, the weight factors equal ½, while in another embodiment, $c_1 = ⅔$. The weight factors may be determined in a manner that minimizes the mean square error in various calibration curves. In still other embodiments, the resistivity estimation is a weighted sum of resistivities determined for the separately measured currents:

$$R = c_0 R_{MIN} + c_1 R_{MAX} = c_0 \, (k \, \delta V / I_{MAX}) + c_1 \, (k \, \delta V / I_{MIN}), \tag{6}$$

where, again, k is a calibration constant based on sensor pad geometry, $I_{MAX}$ is the greater of the corrected electrode currents, $I_{MIN}$ is the lesser of the corrected electrode currents, and $c_0$ and $c_1$ are weight factors that sum to unity.

Figure 8B:
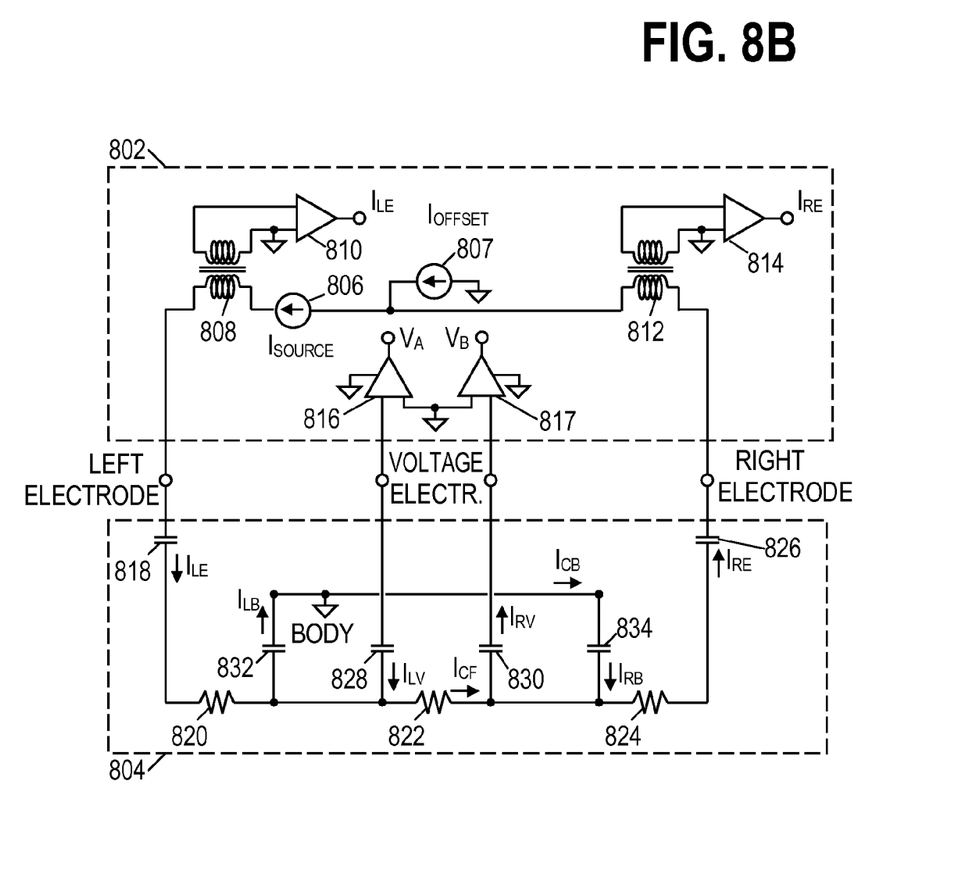
FIG. 8B shows an illustrative controller transmitter circuit model for the illustrative sensor pad.

Referring now to FIG. 8B, an alternative embodiment of the split excitation current transmitter configuration for altering current amplitude and phase is shown. In the present embodiment, transmitter 806 may be fixed or settable sources, or may be implemented as a single stage with a reference terminal that is driven from an offset current exciter, shown as control transmitter 807. Transmitter 806 serves to drive the excitation current injected from current electrodes 506, 508, while control transmitter 807 provides an ability to control the amplitude and phase offset of the current electrode voltages as required to minimize the common mode voltage present at the voltage electrodes. Control transmitter 807 may be of the voltage source type, current source type, or a combination thereof, and is preferably controlled by the use of firmware or hardware based NCO's.

Figure 8C:
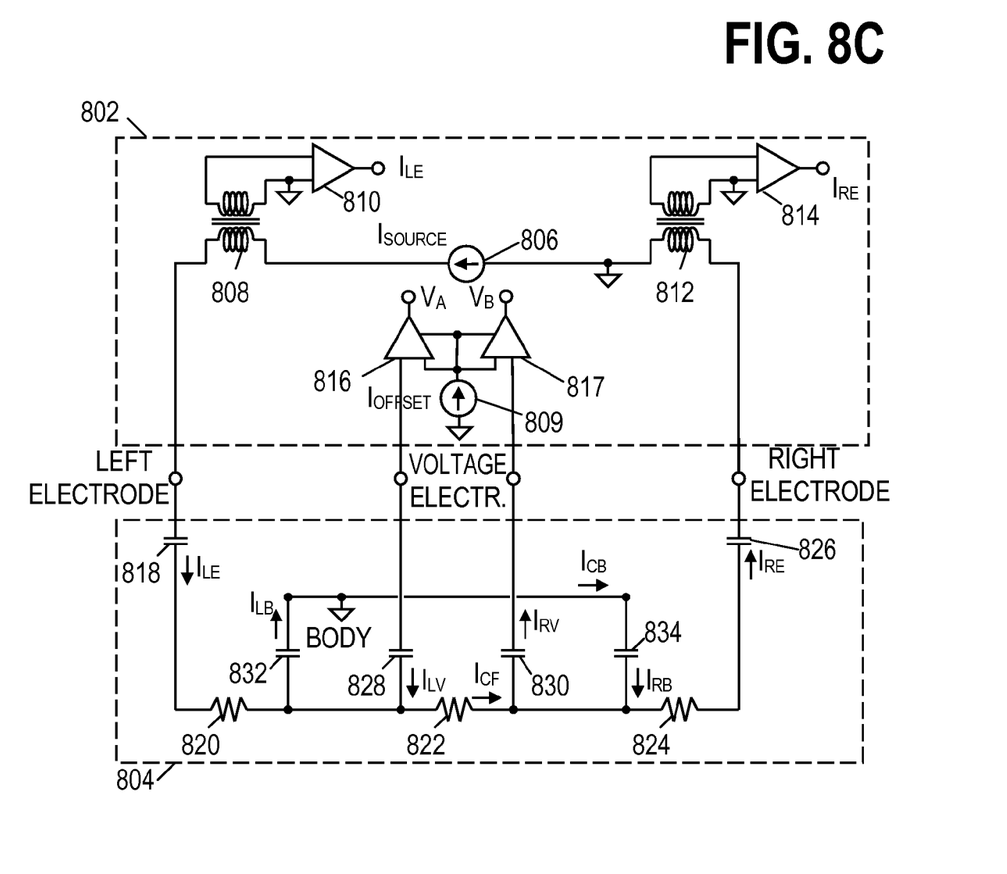
FIG. 8C shows an illustrative transmitter-controlled differential voltage amplifier circuit model for the illustrative sensor pad.

Referring now to FIG. 8C, an additional alternative embodiment of a controllable excitation current transmitter for altering current amplitude and phase is shown. The present embodiment illustrates how a second transmitter 809 may be utilized to control the reference terminals of detector 816 in a manner that minimizes the perceived common mode voltage signal at the input signal at detector 816. Transmitter 809 may be of the voltage source type, current source type, or a combination thereof, and is preferably controlled by the use of firmware or hardware based NCO's.

Figure 9:
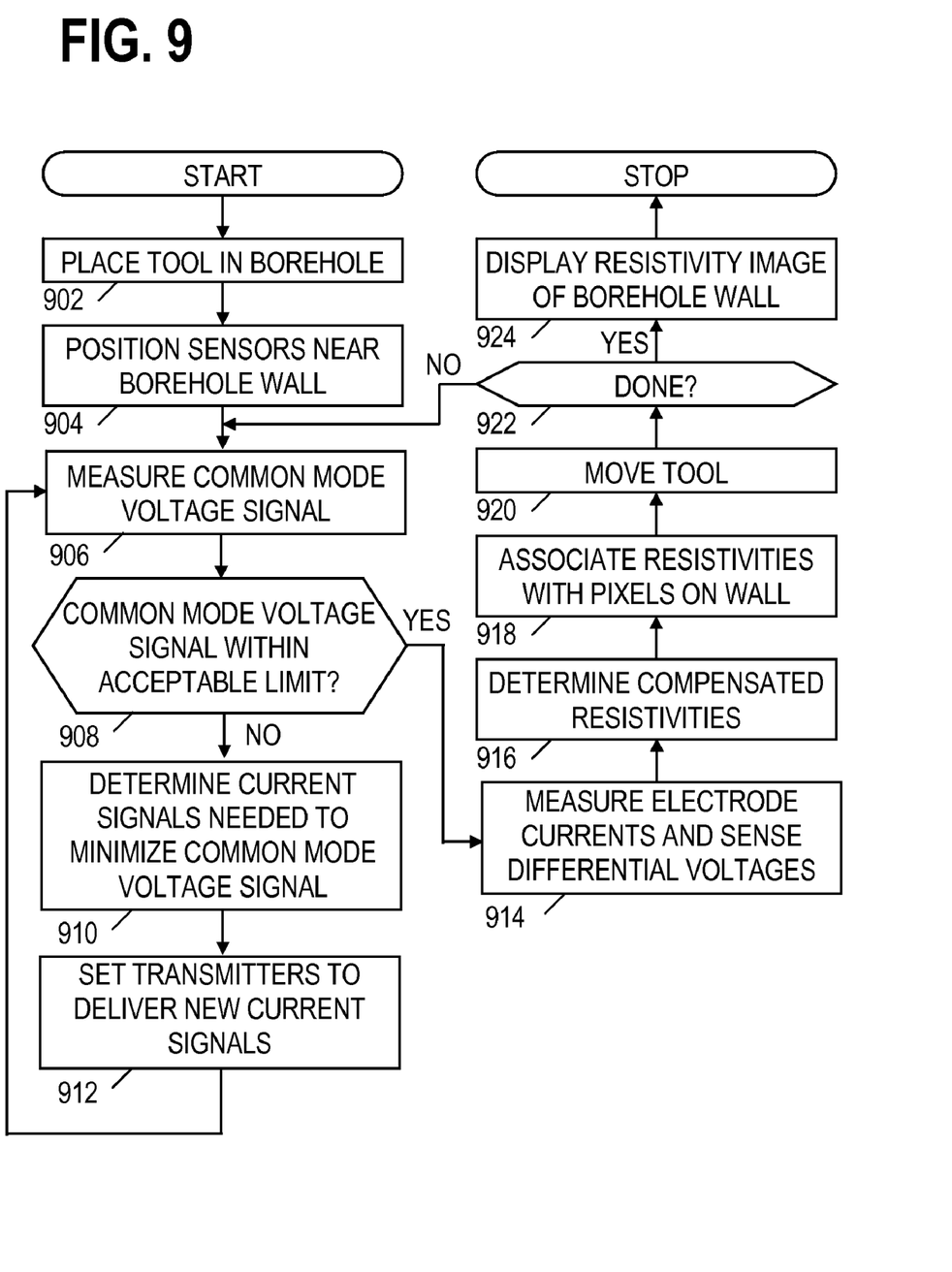
FIG. 9 shows a flow diagram of an illustrative imaging method with common mode voltage minimization.

FIG. 9 shows a flow diagram of a resistivity imaging method. In block 902, the resistivity imaging tool is placed in a borehole. For LWD, the tool is part of the bottom hole assembly to perform logging as drilling operations are performed. For wireline logging, the tool is part of a sonde that is lowered to the bottom of the region of interest to perform logging as the logging tool is pulled uphole at a steady rate.

In block 904, the tool is placed in logging mode. For LWD, this operation may (or may not) involve deploying a decentralizer that forces sensors in the tool body against the borehole wall. Alternatively, the LWD resistivity imaging tool may have one or more sensor pads that are deployed against the borehole wall. For wireline logging, multiple sensor pads are deployed against the borehole wall.

Blocks 906-922 represent operations that occur during the logging process. Though shown and described in a sequential fashion, the various operations may occur concurrently, and moreover, they may simultaneously occur for multiple voltage electrode pairs and multiple sensor pads.

In block 906, the tool measures the potential difference between the formation and the differential voltage amplifier reference ground, referred to as the common mode voltage signal. In block 908, a check of the common mode voltage measurement is performed to determine if the common mode voltage signal is within a limit acceptable to gathering accurate differential voltage measurements from the formation. If the common mode voltage signal is not within acceptable limits, in block 910 the magnitude of excitation current amplitude and/or phase alteration that is needed to minimize the common mode voltage signal is determined. The excitation current transmitters are then set to deliver new current amplitude and/or phase to minimize the common mode voltage signal in block 912. Block 906-912 may be repeated until the common mode voltage is detected within limits acceptable for formation resistivity imaging.

Once the common mode voltage is determined to be within an acceptable limit, in block 914 the tool measures the currents through the two current electrodes, and further measures the voltage difference between the various voltage electrode pairs in this step. In block 916, the tool determines a compensated resistivity measurement for each voltage electrode pair in accordance with one of equations (4), (5), or (6). In block 918, the tool, or more likely, the surface logging facility coupled to the tool, associates the compensated resistivity measurements with a tool position and orientation measurement, thereby enabling a determination of borehole wall image pixel values.

In block 920, the tool moves along the borehole, and in block 922, a check is performed to determine whether logging operations should continue (e.g., whether the logging tool has reached the end of the region of interest). For continued logging operations, blocks 906-922 are repeated. Once logging operations are complete, the surface logging facility maps the resistivity measurements into borehole wall image pixels and displays a resistivity image of the borehole wall in block 924.

A variety of voltage electrode geometries are possible and may be used. A greater number of voltage electrodes may provide higher resolution at the expense of increased processing costs. In such arrangements, it is contemplated that the common mode voltage to be minimized will be the average of voltage signals from all of the voltage electrodes at which measurements are being taken. The operating voltages and currents may vary widely while remaining suitable for the logging operations described herein. It has been found that source current frequencies above about 5 kHz, and perhaps as high as 100 kHz or more, are desirable as they reduce the mud layer impedances and increase the voltage differences measurable between the voltage electrodes. In some tool embodiments, the source current frequency may be switchable between low frequency (e.g., 10 kHz) and high frequency (e.g., 80 kHz) for measurements in formations of differing resistivity. Higher frequencies may be preferred for formations having a generally lower resistivity, and vice versa.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, though the disclosure and claims use the term "resistivity", it is widely recognized that conductivity (the inverse of resistivity) has a one-to-one correspondence with resistivity and, consequently, often serves as a functional equivalent to resistivity. Accordingly, the scope of protection is not limited to the embodiments described herein, but is only limited by the claims which follow, the scope of which shall include all equivalents of the subject matter of the claims.

What is claimed is:

1. A logging method that comprises:
   creating an oscillatory electric field in a borehole wall using at least two current electrodes driven by an excitation source;
   determining a common mode voltage for at least two voltage electrodes positioned between the at least two current electrodes; and
   setting a reference voltage of a voltage detector approximately equal to the common mode voltage.

2. The method of claim 1 further comprising measuring a differential voltage between the at least two voltage electrodes using the voltage detector.

3. The method of claim 2, further comprising:
   determining a resistivity value using the differential voltage.

4. The method of claim 3, further comprising correlating the resistivity value with a position on the borehole wall and displaying a borehole image that represents at least the position on the borehole wall associated with the resistivity value.

5. The method of claim 1, wherein the excitation source comprises two excitation sources each coupled between a ground node and a corresponding one of the current electrodes.

6. The method of claim 5, wherein the two excitation sources produces a synchronized excitation voltage at a desired frequency with the relative phase and amplitude independently controlled.

7. The method of claim 6 wherein the two excitation sources are independently controlled by a numerically controlled oscillator.

8. The method of claim 6 wherein the two excitation sources are independently controlled by a phase-locked-loops.

9. The method of claim 6, wherein the reference voltage is the ground node, and wherein said setting comprises adjusting gains of the two excitation sources to minimize the common mode voltage.

10. The method of claim 1, further comprising a controller excitation source coupled between a ground node and the excitation source, and wherein the excitation source is coupled between the at least two current electrodes.

11. The method of claim 10, wherein the excitation source drives the electric field emanating from the at least two current electrodes, and the controller excitation source independently controls the relative amplitude and phase offset of a synchronized excitation voltage.

12. The method of claim 1, wherein the excitation source is coupled between a ground node and the at least two current electrodes.

13. The method of claim 12, wherein a controller excitation source is coupled to and controls the reference ground of the voltage detector.

14. The method of claim 13, wherein the controller excitation source produces a synchronized excitation voltage at a desired frequency with the relative phase and amplitude independently controlled.

15. A method of improving a current measurement in a downhole oil-based mud sensor array comprising:
providing a sensor pad with at least two current electrodes;
providing a voltage detector; and
providing at least two excitation sources to each drive a corresponding one of the current electrodes,
wherein the at least two excitation sources produce a synchronized excitation voltage, and the synchronized excitation voltage is altered to set a reference voltage of the voltage detector approximately equal to a common mode voltage.

16. The method of claim 15, wherein the synchronized excitation voltage is produced at a desired frequency with the relative phase and amplitude independently controlled.

17. The method of claim 15, wherein the at least two excitation sources are each coupled between a ground node and the corresponding one of the current electrodes.

18. The method of claim 17, wherein the reference voltage is the ground node, and wherein said altering comprises adjusting gains of the at least two excitation sources to minimize the common mode voltage.

19. An oil-based mud imaging tool that comprises:
a sensor array having at least two voltage electrodes and at least two current electrodes, wherein the at least two current electrodes are energized by an excitation source to create an oscillatory electric field in a borehole wall;
at least one voltage detector coupled to the at least two voltage electrodes to measure at least one of a differential voltage created by the oscillatory electric field and a common mode voltage created by the oscillatory electric field; and
a circuit in communication with the at least one voltage detector and the excitation source to minimize the common mode voltage.

20. The oil-based mud imaging tool of claim 19, wherein the circuit further determines a resistivity value based at least in part on the differential voltage.

21. The oil-based mud imaging tool of claim 19, wherein the excitation source comprises two excitation sources each coupled between a ground node and a corresponding one of the current electrodes.

22. The oil-based mud imaging tool of claim 21, wherein the two excitation sources are independently controlled by a numerically controlled oscillator.

23. The oil-based mud imaging tool of claim 19, further comprising a controller excitation source coupled between a ground node and the excitation source, and wherein the excitation source is coupled between the at least two current electrodes.

24. The oil-based mud imaging tool of claim 23, wherein the excitation source drives the electric field emanating from the at least two current electrodes, and the controller excitation source independently controls the relative amplitude and phase offset of a synchronized excitation voltage.

25. The oil-based imaging tool of claim 19, wherein a controller excitation source is coupled to and controls a reference ground of the voltage detector.

* * * * *